United States Patent [19]
Breelle et al.

[11] 3,890,076
[45] June 17, 1975

[54] DEVICE FOR THE SEALING OF A BLOCK FORMED OF A PILE OF PLATES, SUCH THAT OF FUEL CELL, WHILE MAINTAINING FREE PASSAGEWAYS BETWEEN THESE PLATES

[75] Inventors: Yves Breelle, Le Pecq; Alain Grehier, Paris; Marcel Paty, Les Essarts Le Roi, all of France

[73] Assignee: Institut Francais du Petrole, des Carburants et Lubrifiants, France

[22] Filed: Jan. 24, 1973

[21] Appl. No.: 326,548

[30] Foreign Application Priority Data
Jan. 31, 1972 France .............................. 7203220

[52] U.S. Cl. ................. 425/110; 425/123; 249/84; 164/108; 164/1
[51] Int. Cl. .............................................. B29c 1/00
[58] Field of Search ...... 425/110, 123, 111; 249/84, 249/85, 91, 83, 92; 29/204; 164/DIG. 1, 108, 109

[56] References Cited
UNITED STATES PATENTS
| | | | |
|---|---|---|---|
| 1,492,875 | 5/1924 | Wheat | 249/83 |
| 2,306,732 | 12/1942 | Huxham | 425/123 |
| 3,236,924 | 2/1966 | McClarney et al. | 425/123 X |

*Primary Examiner*—Francis S. Husar
*Assistant Examiner*—Robert J. Charuat
*Attorney, Agent, or Firm*—Craig & Antonelli

[57] ABSTRACT

Device for sealing a block formed of a piling of spaced plates by casting of a resin while preserving free passageways on at least one side of the block comprising a set of separating members for insertion between some plates of the block before the casting operation and adapted to be removed thereafter so as to liberate the corresponding space and form the desired passageways.

8 Claims, 10 Drawing Figures

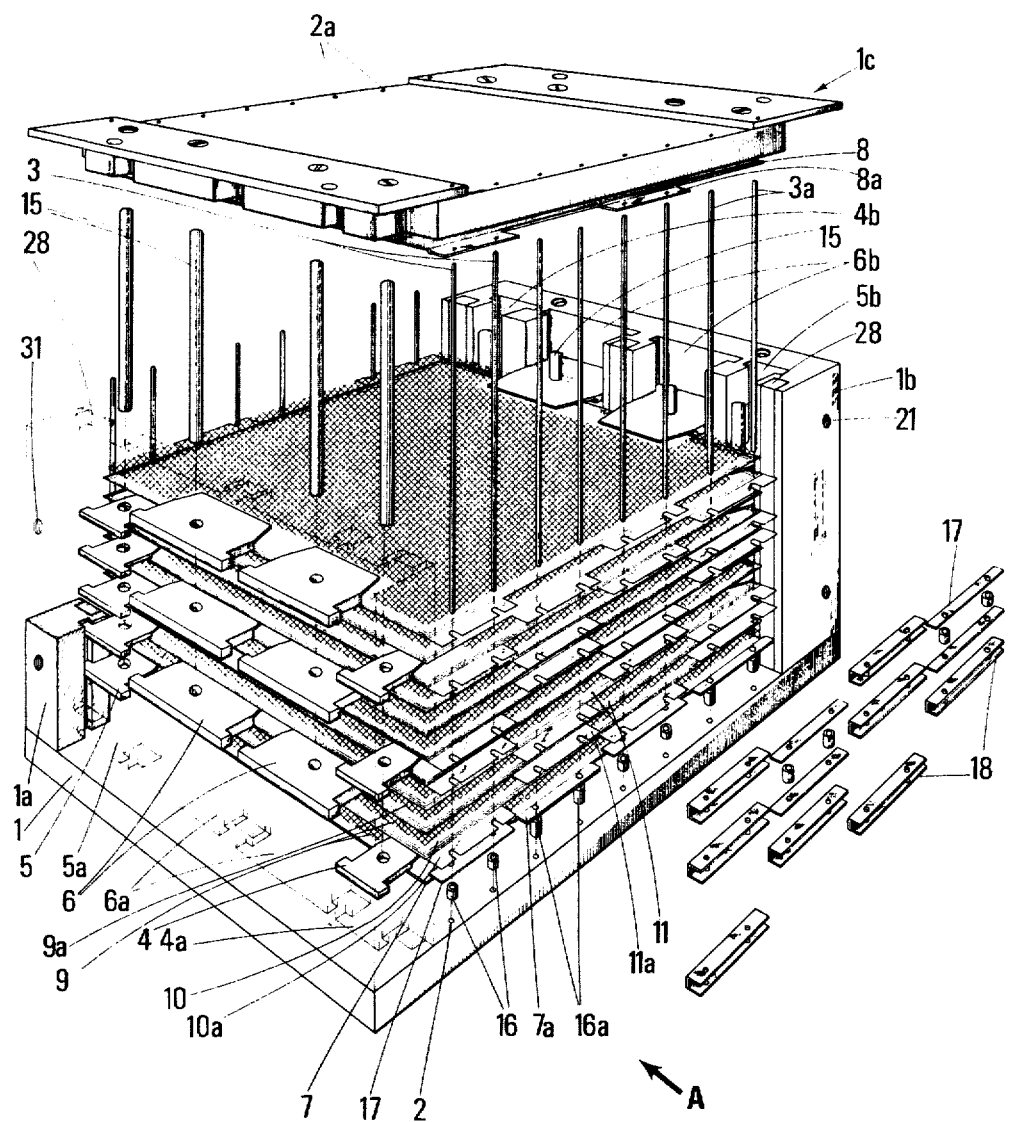

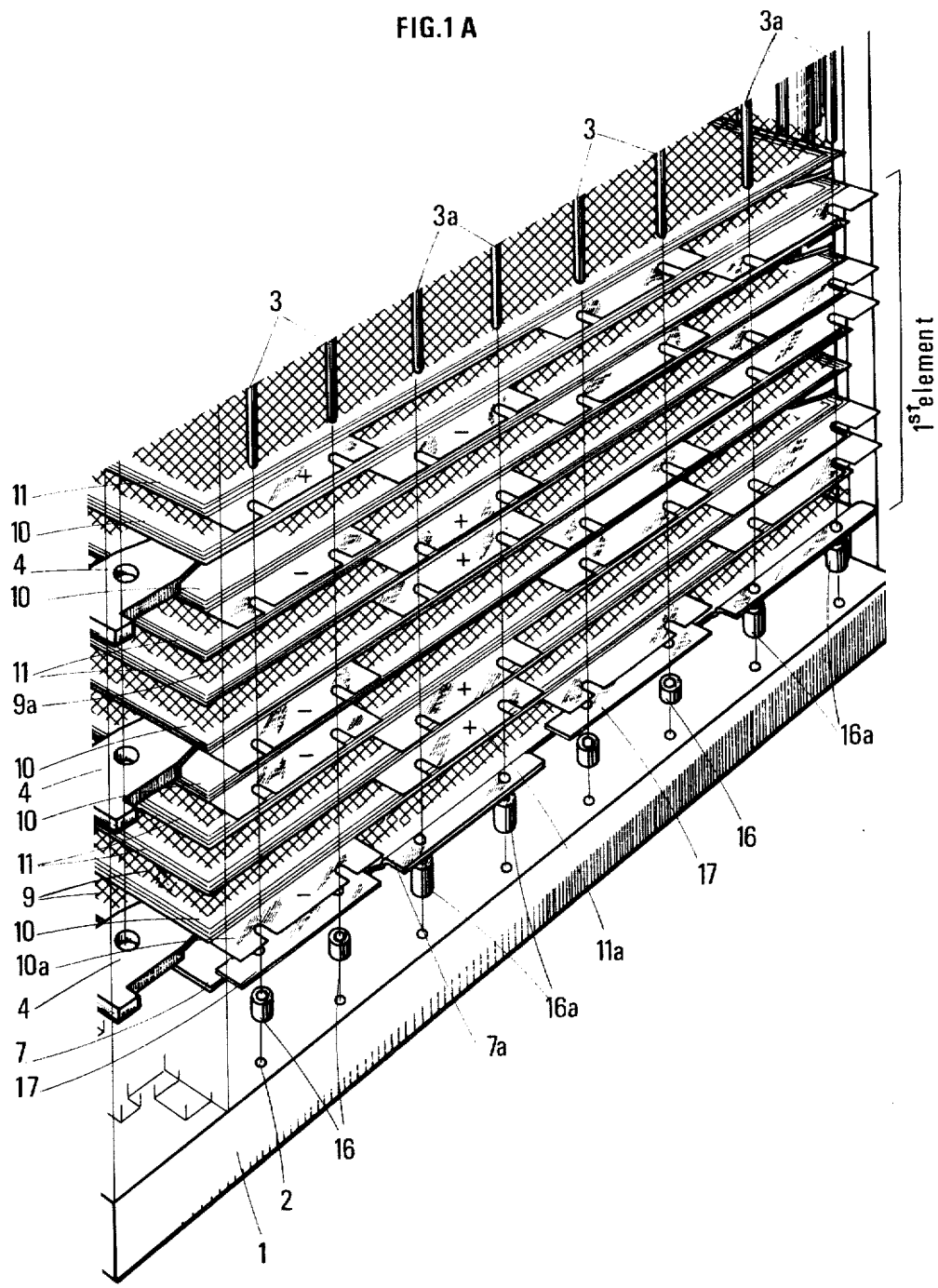

DEVICE FOR THE SEALING OF A BLOCK FORMED OF A PILE OF PLATES, SUCH THAT OF FUEL CELL, WHILE MAINTAINING FREE PASSAGEWAYS BETWEEN THESE PLATES

The present invention relates to a new device which may be used, in particular, for the sealing of a fuel cell block, while maintaining free inlet and outlet passageways for the fluids of this fuel cell.

In the following, reference will particularly be made to the manufacture of fuel cells but it is clear for any one skilled in the art that the invention can be used wherever it is necessary to provide for the sealing of a block formed of a piling of plates in spaced relationship from one another, while maintaining at predetermined locations free passageways between some of the plates, on at least one of the lateral walls of this block.

A fuel cell is formed of a pile of plates of small thickness constituting the electrodes of the fuel cell, these plates being kept in spaced relationship from one another by separating means providing passages for the flow of fluids between adjacent electrodes.

These fluids may consist, according to the case, of an electrolyte, an oxydizing gas (for example air or oxygen), or a reducing gas (such as, for example, hydrogen).

These electrodes are electrically connected to one another, so as to constitute a series or parallel lay-out, the connection being for example provided through metal connecting elements.

A first object of the invention is to provide a device for sealing the block formed of a pile of electrodes, while maintaining therethrough free inlet and outlet passageways for the fluids flow between these electrodes.

This object is achieved by providing each side wall of the block with a casting of an insulating resin filling the spaces between the electrodes over a limited height from the edge of the electrodes after having placed, at the locations selected for the passages of the different fluids, separating elements or members penetrating into the spaces between the electrodes, the lenght of said members being at least equal to the height of said casting and their width at least equal to the width of the passageway to be left free for each flow of fluid between the electrodes.

The resin which is used must be of a type suitable for casting, such as for example, but not limitatively, an epoxy resin.

The main object of the invention is to provide for a very accurate positioning of the separating members and for an easy extraction or drawing of these members, without any liability of destruction of the electrodes, when the sealing casting has been achieved.

According to a preferred embodiment of the invention, the separating members will be made of a material of the hereinunder indicated type, having anti-adhesive properties with respect to the material used for the sealing casting. A polytetrafluorethylene, for example, is convenient.

The selection of such a material for the separating members makes easier the removal thereof after the resin casting operation.

It will be also possible, however, to choose for the separating members, a quite different material, provided, for example, that these separating members be coated, prior to the resin casting with a film of a material facilitating the detachment of said separating members.

Non limitative embodiments of the invention will be described hereinunder, with reference to the accompanying drawings, wherein:

FIG. 1 is an overall view of a fuel cell in the course of its manufacture.

FIG. 1 A is a partial view, on a larger scale of this fuel cell, taken in the direction of the arrow A of FIG. 1.

FIG. 1 B shows a separating member.

Figure 2:
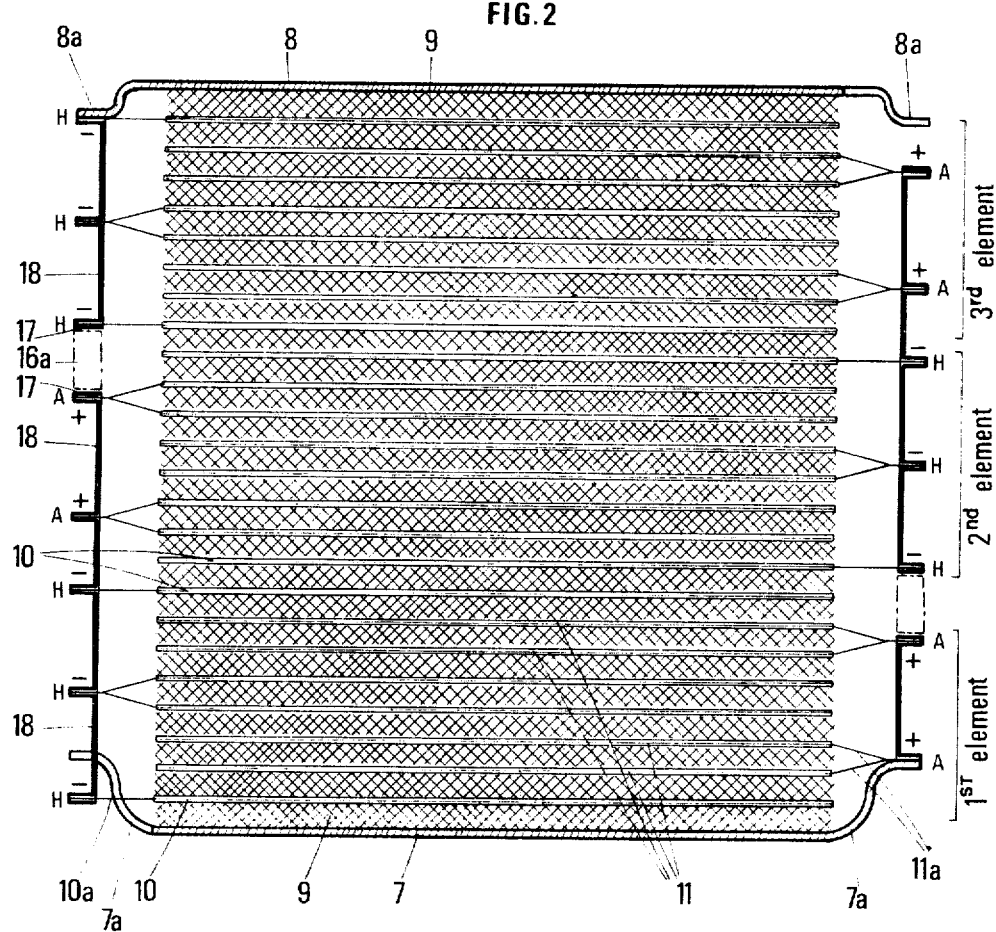
FIG. 2 illustrates an embodiment of the means for connecting the electrodes.

In the embodiment illustrated, by way of example, in FIGS. 1 and 2, the electrodes of the fuel cell are thin plates formed of three superimposed layers comprising a layer of a sintered metal, such as nickel, or an expanded metal, destined to be in contact with the electrolyte, a middle layer of carbon powder including an oxidation or reduction catalyst, a microporous layer wherethrough the gas is diffused but which forms a barrier for the electrolyte, on the side of the electrode in contact with the oxydizing or reducing gas.

The electric current is collected by connecting elements integral with the layer of sintered or expanded metal of each electrode. These connecting elements can be placed on the same side of the fuel cell.

In order to permit and facilitate the assembling of fuel cell elements, there is provided an assembling block comprising a shoe 1, side walls 1a and 1b and a cover 1c designed for this purpose.

The shoe 1 and the cover 1c are provided with blind holes: the holes 2 (FIG. 1 A) in the shoe 1 and the holes 2a in the cover 1c.

These holes register with one another when the cover 1c is fixed to the side walls 1a and 1b. They permit the insertion of the rods 3 and 3a (see FIGS. 1 and 1 A).

The sidewalls 1a and 1b are provided with T-shaped slots, 4a–4b, 5a–5b, 6a–6b, housing separating members or partitions 4, 5 and 6. These separating members are destined to provide in the resin, during the casting operation, free passageways for the different fluids: oxygen-containing gas (e.g air), hydrogen, electrolyte (e.g potash).

As illustrated in FIG. 1 B, these separating members comprise a body 12 substantially T-shaped or shaped as a dovetail with a thickness h calculated and calibrated in accordance with the type of fluid to be conveyed through the corresponding passage (air, hydrogen or potash), a tooth 13 in the extension of the body 12, this tooth having the shape of a truncated V, a thickness e corresponding to the spacing of the electrodes and a length 1 at least equal to the depth of penetration of the casted resin into the block formed by the fuel cell. Each separating member is provided with a bore 14 adapted to receive a stiffening stem 15 maintaining in pile the separating members during the stripping of the block after the casting operation has been completed.

The electrodes are maintained spaced from each other through spacing and insulating layers, these layers consisting for example of sheets of insulating material or also, as shown in the illustrated embodiment, of rectangular plates formed of hollow lozanges made of insulating material, having cut-out parts at the places of the inlet and outlet passageways for the fluids.

The thickness of these insulating spacing members or layers 9 is greater or substantially equal to the thickness $e$ of the teeth 13 of the separating members 4, 5 and 6.

The block constituted by the shoe 1, the side walls 1a and 1b being held in place as illustrated, without the cover 1c, the rods 3, 3a are positioned into the holes 2.

Washers 16, 16a are positioned on the rods 3 and the connecting elements 17 are placed on the washers 16. A lower plate 7 constituting a positive terminal of the fuel cell is positioned, this plate being slidable along the rods 3a, by means of the ear-shaped collectors 7a, upwardly folded, these ear-shaped collectors 7coming into abutment against the washers 16a.

Then the fuel cell elements can be piled up.

A separating element 9 provided with suitable cut-out parts is placed and positioned on plate 7.

Two separating elements 4 are positioned in the slots 4a and 4b respectively.

A hydrogen electrode 10, called H-type electrode, is positioned with its ear-shaped current collectors 10a resting on the connecting elements 17, which, since they are being held in place by the rods 3, provide for an accurate positioning of the electrode 10.

Four connecting members 18 (FIG. 1), providing for the electrical connection are slidably mounted on the rods 3, these connecting members being laid onto the collectors 10a of the electrode 10.

A new separating layer 9 is positioned on the electrode 10, the two separating elements 5 are positioned in the slots 5a and 5b.

An air electrode 22 11 A-type electrode) is placed on the separating layer 9 which is already in place, this electrode being positioned through its ear-shaped collector 11a, slidably mounted on the rods 3a, said collector being laid on the ear-shaped collector 7a of the lower plate 7 which is used as a positive terminal for the fuel cell.

A separating element 9a having suitable cut-out parts is placed and positioned on the electrode 11.

Four separating members 6 are placed in the slots 6a and 6b, (two on each of the side walls 1a and 1b).

A new type-A electrode 11 is positioned with its ear-shaped collector laid on the ear-shaped collector of the preceding electrode.

Four connecting members 18 are then positioned, these connecting members being slidably mounted on the rods 3a and being laid on the ear-shaped collector 11a of the last positioned A-type electrode 11.

A new separating layer 9 is positioned and two separating elements 5 are placed in the slots 5a and 5b respectively, a new H-type electrode 10 covering this separating member 9 and being positioned by means of the ear-shaped collectors 10a which are held in place through the rods 3 and are laid on the connecting member 18 which has been previously positioned.

Another separating layer 9 is laid and positioned on the electrode 10 which has been previously positioned and two separating members 4 are placed in the slots 4a and 4b respectively.

A H-type electrode 10 covers this separating layer 9 and is positioned by means of its ear-shaped collectors 10a which are slidable along the rods 3 and rest on the ear-shaped collector 10a of the electrode 10 which has been already positioned.

Four connecting members 18 slidably mounted on the rods 3 are laid on the already positioned ear-shaped collectors 10a.

The arrangement which has been selected in this embodiment (and which is given by way of example only) will appear more clearly when considering the diagrammatical illustration of FIG. 2. It can be seen that the electrode piling comprises successively in each element: one H-type electrode 10, two A-type electrodes 11, two H-type electrodes 10, two A-type electrodes 11 and one H-type electrode 10.

The detailed construction is shown in FIG. 1A. The last H-type electrode 10 of the first element is maintained and positioned by the rods 3 passing through the ear-shaped collectors 10a, the following H-type electrode 10 of the second element has collecting ears which are offset with respect to those of the preceding electrode and is maintained and positioned through its ear-shaped electrode 10a through which pass the rods 3a.

The foregoing applies to the relative arrangement of the last A-type electrode 11 of the first fuel cell element and the first A-type electrode 10 of the second fuel cell element.

It is possible to insert the stiffening rods 15 into the holes 14 of the different separating elements when the piling constituting one fuel cell element is achieved. It is also possible to insert the rods 15 when the piling of the assembly of elements constituting the fuel cell is achieved.

The fuel cell is terminated at its upper end by a plate 8 acting as negative terminal for the fuel cell, this plate being positioned through the rods 3 cooperating with the earshaped collectors 8a.

The cover 1c is splaced on the fuel cell elements and slightly compresses the assembly so as to give the piling an accurate preselected height.

The rods 3 and 3a pass through apertures 2a in the cover.

The electrical connection is achieved as hereinunder indicated:

The electrodes of same polarity of one fuel cell element are interconnected. Moreover when proceeding from a first fuel cell element to an adjacent second fuel cell element, the negative terminal of the first element is connected to the positive terminal of the second element through a connecting member as illustrated by FIG. 2.

There is thus obtained a fuel cell element with series and parallel connections.

In the above-described embodiment the positive terminal of the first fuel cell element is insulated from the negative terminal of the second fuel cell element as hereinunder indicated: on the last ear-shaped collector 11a of the last A-type electrode 11 of the first element, when considering the electrodes and fuel-cell elements in their piling order, a connecting element 17 is placed and held in place through the rods 3a.

On this connecting element 17, two washers 16a (FIG. 1) are positioned on the rods 3a and laid down. Another connecting element 17 is positioned on the rods 3a and is laid onto the washer 16a.

On this connecting element 17 an ear-shaped collector 10a of a H-type electrode 10 is positioned.

Figure 3:
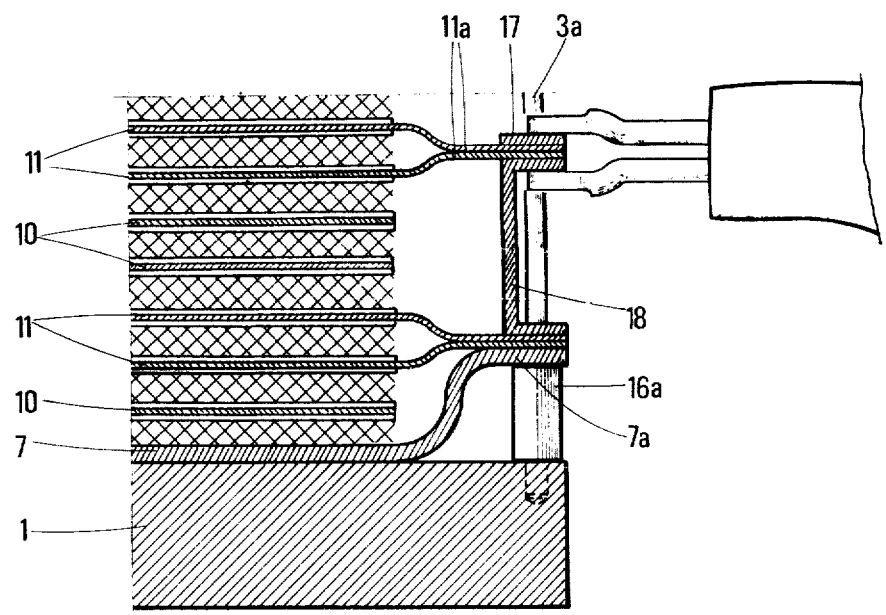
FIG. 3 shows a method for soldering the connecting elements to the ear-shaped collectors of the electrodes.

The connection is made rigid by spot welding the connecting element 17 with the different collecting ears and the connecting member 18, as illustrated by FIG. 3. This operation is effected when the cover 1c has been positioned on the assembling block.

When this operation has been achieved, only the rods 3 and 3a are removed. The washers 16 and 16a are released and fall. The block is then ready for the casting operations.

Figure 4:
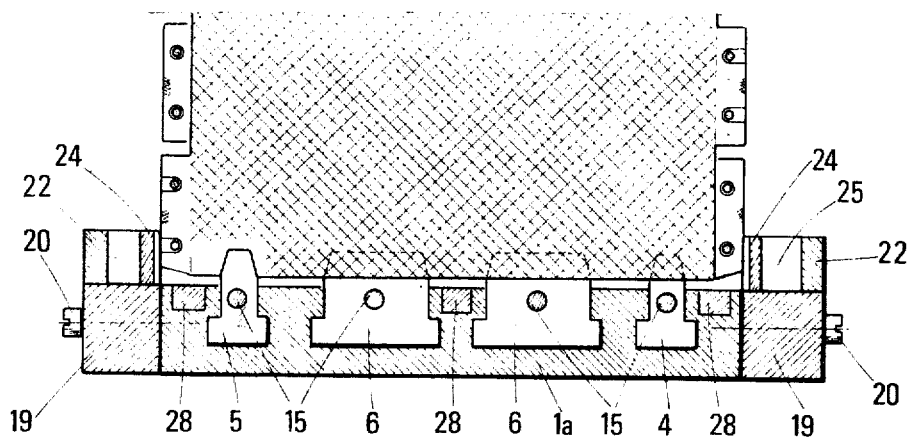
FIG. 4 illustrates a cross-section through a vertical plane (plane 4—4 of FIG. 5) of the block formed by the elements constituting the fuel cell, during the first stage of the first resin casting.
Figure 5:
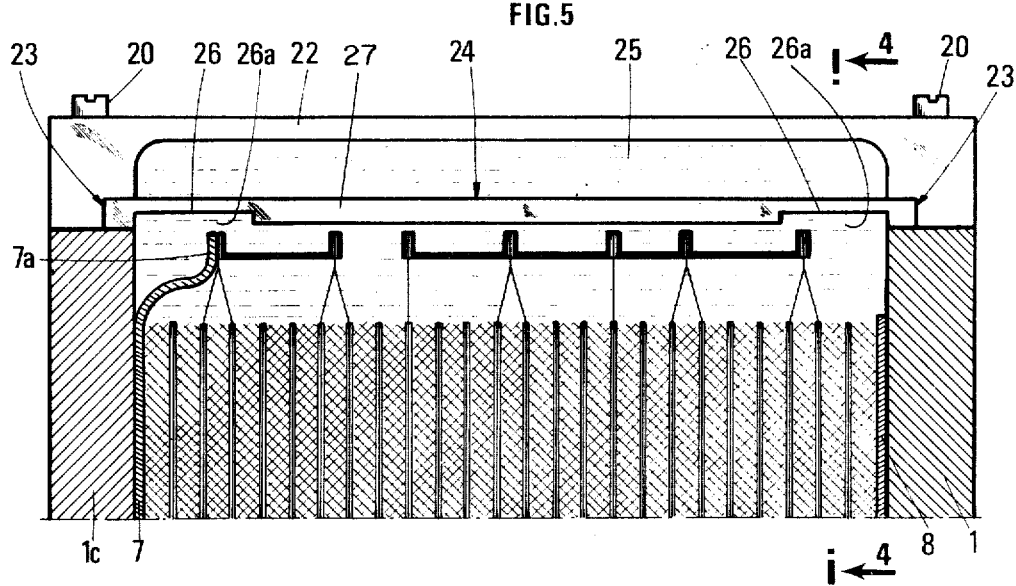
FIG. 5 is a view from above of this block, the fuel cell being cut by a horizontal plane.

FIGS. 4 and 5 illustrate a first stage of the first resin casting around the obtained piling, this first casting comprising two operations. During the first operation, the fuel cell is placed vertically and thus rests on the side wall 1a or 1b (FIG. 4).

An assembly border member 19 is secured to the sidewall 1a by screws 20 entering bores 21 (FIG. 1). A resin receptacle or container 22 is placed on each side of the border member 19 and made integral therewith. This container is provided with two cut-out parts 23 (FIG. 5), adapted to receive and position a separating element 24 after the casting has been achieved.

Figure 6:
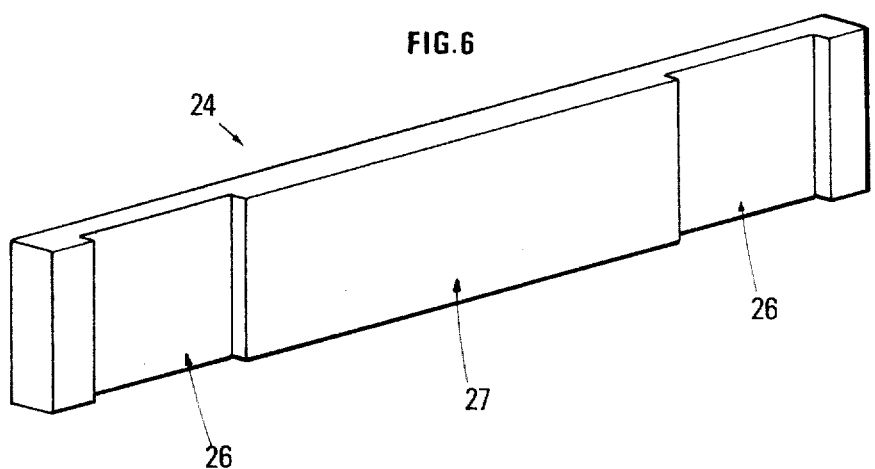
FIG. 6 illustrates one of the separating elements used for the first resin casting.

A predetermined volume of resin 25 is poured by half in each receptacle 22. This resin 25 penetrates the fuel cell block over a predetermined height. When it is assumed that the penetration height of the resin is maximum, this resin 25 being still in a liquid or semi solid state, the separating element 24 (FIGS. 4, 5 and 6) is positioned in the cut-out parts 23. The resin 25 being solidified, the border member 19 and the receptacle 22 are disconnected and the separating elements 24 are removed.

The same operation is then effected on the opposite side of the cell block. The central part 27 allows the passage of the resin during the two stages of the last casting operation which will be now described. The central part 27 of greater thickness creates a recess 27a (FIG. 5) between two feet 26a constituted by the poured resin 25, this recess leaving a free passage for the resin during the two stages of the last casting operation which will be described hereunder with reference to FIG. 8.

Figure 7:
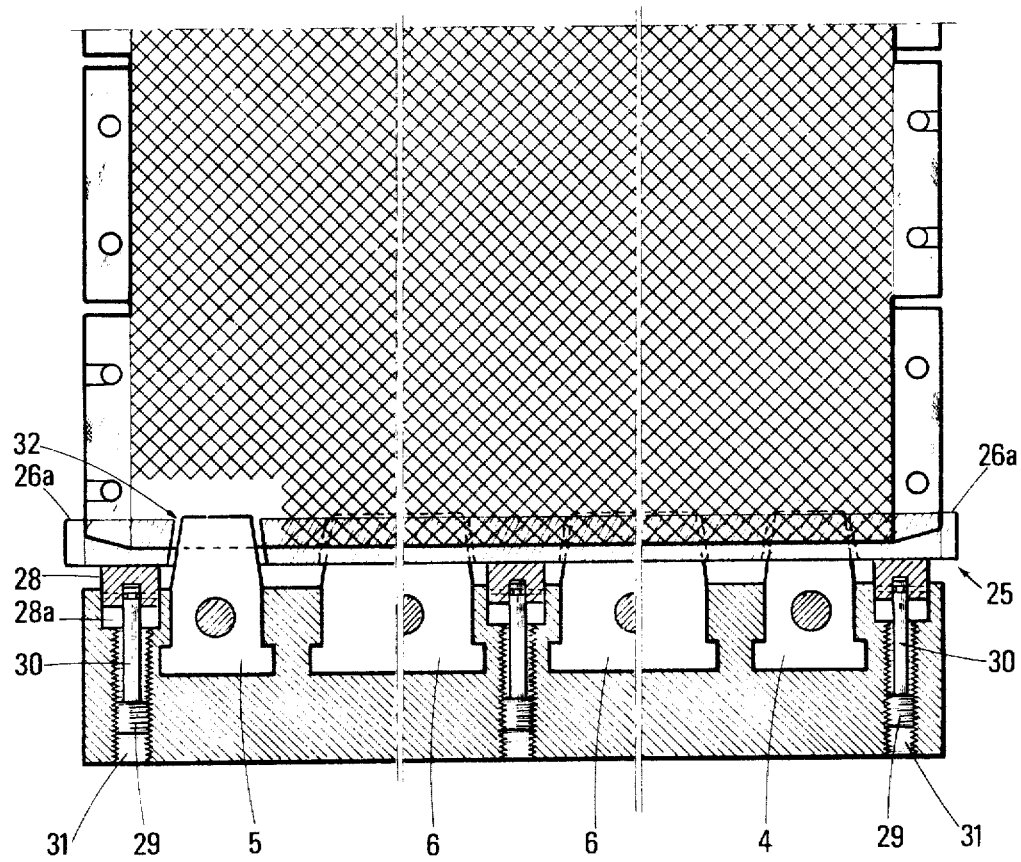
FIG. 7 shows the extraction of the separating elements out of the block formed by the fuel cell, after the first resin casting.

The purpose of the separating elements 24 is to accurately fix the external size of the fuel cell block. Once the first casting has been achieved, the cover 1c and the shoe 1 of the assembling block are disconnected (FIG. 1). The side walls 1a and 1b provided with the separating elements 4, 5 and 6 must then be removed. To this end there are used extracting means 28 (FIGS. 1 and 7). These extracting means 28 housed in recesses 28a are connected to screws 29 integral with an axis 30. The axis 30 is made fast in translation with the extracting means by any suitable meand and is freely rotatable with respect to these means. By screwing regularly and simultaneously all the screws 29 located in the threaded bores 31, the extracting means are pushed out of the recesses wherein they are housed and push the block of resin 25. The separating elements 4, 5, 6 are thus disengaged from their housings 32 in the resin.

Figure 8:
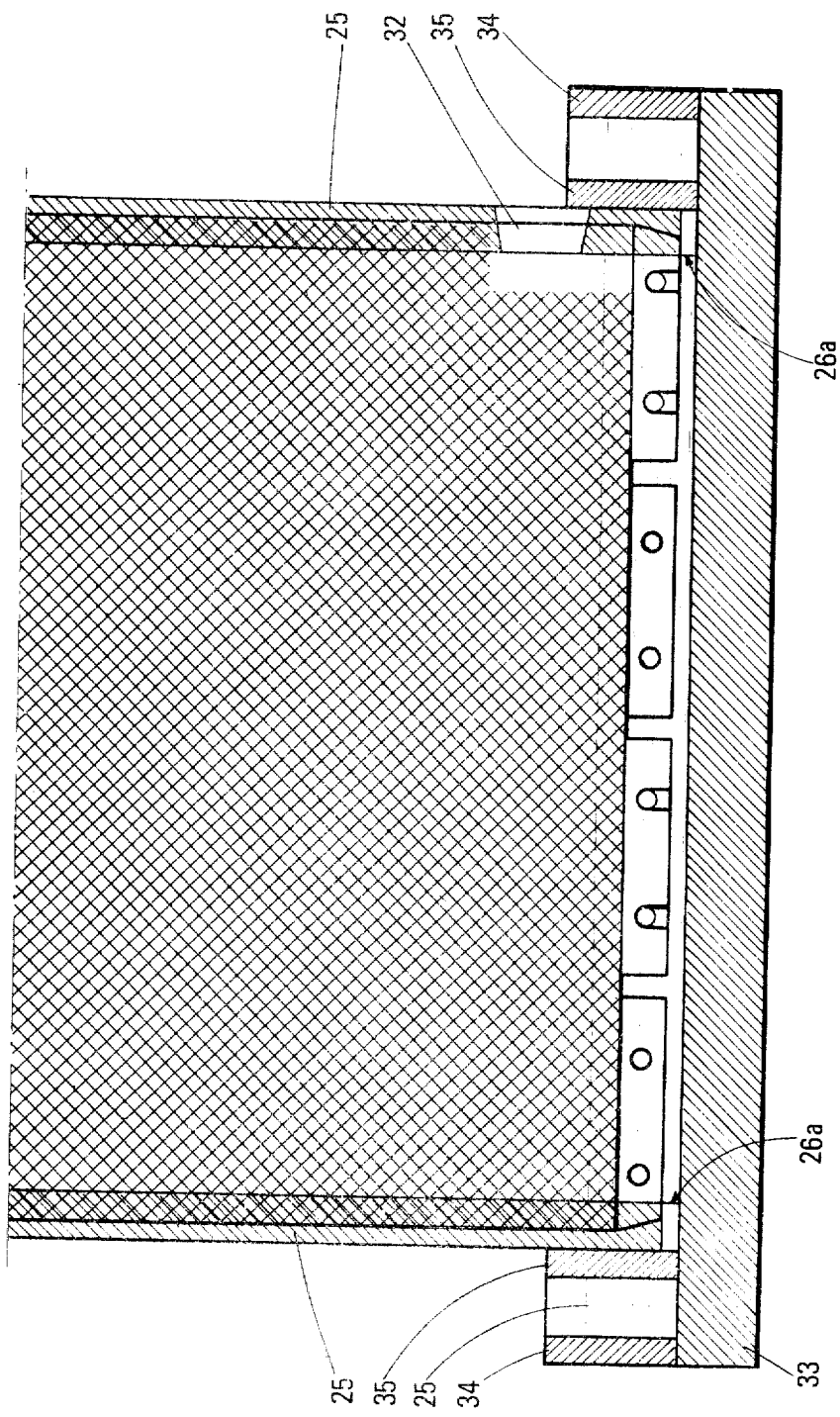
FIG. 8 illustrates the first stage of the end casting.

FIG. 8 illustrates the first stage of the last casting operation.

The fuel cell, on its side corresponding to the ear-shaped collectors is placed and centered on a shoe member 33. Two receptacles 34 are placed on both sides of the fuel cell and secured to the shoe member 33 by means of screws. EAch receptacle is provided with two cut-out parts (not shown) for receiving the separating element 35. This separating element 35 is a simple rectangular parallelipiped.

The pile laying on the shoe member 33 through foot members 26a which have been formed (FIG. 5) during the first casting through the recesses 26 of the separating element 24, is ready to receive the resin 25. A predetermined volume of this resin is poured by half into the two receptacles 34, passes through the aperture or recess 27a which remains free between the feet 26a on one and the same side of the fuel cell and penetrates into this fuel cell over a preselected height. When it is assumed that the resin has reached this preselected height, the resin being then still in a liquid or semi-solid state, the separating element 35 is positioned. When the resin 25 is solidified the same operation is performed on the last side of the fuel cell.

When the casting has been effected on the four sides of the piling, the fuel cell has the shape of a parallelipipedic block.

What we claim is:

1. A removable casting device for sealing at least the periphery of a block of piled adjacent plates maintained in spaced relationship to one another during casting, said device comprising:

separating means for insertion between the adjacent plates in such a manner to provide fluid flow passageways between sealed adjacent plates in use, an assembly for arranging said piled adjacent plates in piled relationship comprising removable base plate means, and at least one removable side wall means for positioning said separating means between the adjacent plates, said sidewall means having extracting means for separating said block from said separating means and said at least one side wall means after casting to form the fluid flow passages, and retaining means for retaining said separating means on said at least one side wall means.

2. A device according to claim 1, wherein said retaining means comprise slots in which said separating means are retained, and wherein rod means are provided which extend through portions of the plates during casting to maintain the same in spaced relationship.

3. A device according to claim 2, wherein said slots and said separating means have dovetail-shaped complementary cross-sections.

4. A device according to claim 1, wherein said retaining means include rods passing through said separating elements and penetrating into said base plate of said device.

5. A device according to claim 1, wherein the plates of the piling are the electrodes and separating plates of a fuel cell and wherein said base plate means are adapted to receive removable positioning rods for positioning connection means for electric connection between the electrodes on at least one side of the device between said side wall means.

6. A device according to claim 1, wherein said extracting means are located in a recess provided in said at least one side wall means.

7. A device according to claim 6, wherein the extracting means are movable within said recess so as to move said block away from said at least one side wall means.

8. A device according to claim 7, wherein the extracting means are interconnected to screw means for moving said extracting means within said recess.

* * * * *